United States Patent [19]

Meverden et al.

[11] Patent Number: 5,312,861

[45] Date of Patent: * May 17, 1994

[54] FILLED HYDROLYZABLE COPOLYMER COMPOSITIONS RESISTANT TO PREMATURE CROSSLINKING

[75] Inventors: Craig C. Meverden, Mason; Robert L. Silverman, Cincinnati, both of Ohio

[73] Assignee: Quantum Chemical Corporation, Cincinnati, Ohio

[*] Notice: The portion of the term of this patent subsequent to Nov. 30, 2010 has been disclaimed.

[21] Appl. No.: 885,437

[22] Filed: May 18, 1992

Related U.S. Application Data

[63] Continuation of Ser. No. 735,485, Jul. 25, 1991, abandoned, which is a continuation-in-part of Ser. No. 660,765, Feb. 25, 1991, abandoned.

[51] Int. Cl.$^5$ .................... C08L 43/00; C08F 230/08; C08K 5/54
[52] U.S. Cl. .................... 524/521; 524/547; 525/209; 526/279
[58] Field of Search ............ 524/521, 547; 525/209; 526/279

[56] References Cited

U.S. PATENT DOCUMENTS

| | | | |
|---|---|---|---|
| 4,663,369 | 3/1987 | Kawai et al. | 524/504 |
| 4,753,992 | 6/1988 | Umpleby | 525/100 |
| 4,795,786 | 1/1989 | Umpleby | 525/326.5 |
| 4,975,480 | 12/1990 | Bullen | 524/296 |
| 4,990,554 | 2/1991 | Nomura et al. | 524/423 |
| 5,025,071 | 6/1991 | Bullen | 525/326.5 |
| 5,028,680 | 1/1991 | Bullen | 528/15 |

FOREIGN PATENT DOCUMENTS

0149782A3 12/1984 European Pat. Off. .
0370518A2 11/1989 European Pat. Off. .

OTHER PUBLICATIONS

Samoilov, S. M., "Ethylene Radical Copolymerization with Vinyl Silanes," *Journal of Applied Polymer Science: Applied Polymer Symposium*, 36, 41–48 (1981); John Wiley & Sons, Inc.

*Primary Examiner*—Paul R. Michl
*Assistant Examiner*—Peter Szekely
*Attorney, Agent, or Firm*—Gerald A. Baracka; William A. Heidrich

[57] ABSTRACT

Improved filled silane copolymer compositions resistant to premature crosslinking during compounding and storage but which are readily hydrolyzed and undergo cure in the presence of silanol condensation catalyst are provided. The compositions are comprised of random copolymers of ethylene and vinyltriethoxysilane and contain relatively high levels of particulate fillers. Rubbery ethylene copolymers are included with the silane copolymer to produce compositions with superior physical properties. The invention also relates to the method of crosslinking these compositions by combining the filled silane copolymer compositions with a second component which has a silanol condensation catalyst dispersed in a polymer resin.

28 Claims, No Drawings

FILLED HYDROLYZABLE COPOLYMER COMPOSITIONS RESISTANT TO PREMATURE CROSSLINKING

CROSS-REFERENCE TO RELATED APPLICATIONS

This is a continuation of copending application Ser. No. 07/735,485, filed Jul. 25, 1991, now abandoned which is a continuation-in-part of our application Ser. No. 07/660,765, filed Feb. 25, 1991, now abandoned.

BACKGROUND OF THE INVENTION

1. Field of the Invention

This invention relates to compositions of ethylene-vinyltriethoxysilane copolymers containing relatively high levels of particulate fillers which are resistant to premature crosslinking. Compositions wherein an ethylene polymer having rubber-like properties is included with the silane copolymer and which upon cure exhibit superior physical properties are also disclosed. The invention also relates to an improved method for producing filled crosslinked silane copolymer compositions whereby problems generally associated with processing such materials are minimized.

2. Description of the Prior Art

Crosslinking ethylene polymers to improve their mechanical strength, heat resistance and other properties is well known in the art. One method of crosslinking ethylene polymers involves incorporating alkoxysilane functionality into the polymer structure—either by grafting unsaturated alkoxysilanes onto ethylene polymers or by direct copolymerization of ethylene with unsaturated alkoxysilanes.

The alkoxysilane groups form crosslinks either by the action of heat and/or mechanical working or by hydrolysis/condensation reactions. Considering only the reaction of a single alkoxy group of a silane moiety the hydrolysis/condensation reaction would proceed according to the following schemes:

HYDROLYSIS:

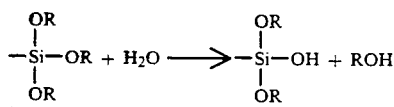

CONDENSATION:

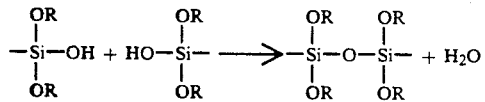

Crosslinkable ethylene polymers prepared by grafting unsaturated alkoxysilanes to ethylene polymers are disclosed in U.S. Pat. No. 3,646,155. Crosslinkable ethylene polymers prepared by copolymerizing ethylene with an unsaturated alkoxysilane are disclosed in U.S. Pat. Nos. 3,225,018 and 3,392,156.

One of the major limitations of crosslinking ethylene polymers which contain alkoxysilane functional groups is that incidental exposure to moisture can initiate the crosslinking reaction prematurely. Significant premature crosslinking can occur even in the absence of silanol condensation catalysts which are typically employed to facilitate the hydrolysis and condensation reactions. Premature crosslinking adversely affects (lowers) the melt index of the ethylene copolymer and, if this occurs to a significant degree, will result in poor processability and unsatisfactory extrudate surface appearance. In extreme cases, extrusion of the ethylene copolymer compositions becomes essentially impossible.

The problem of premature crosslinking is particularly troublesome with filled compositions since particulate fillers can contain substantial amounts of moisture. This moisture is released during the blending operation, batch or continuous, typically mixing on a mill, in a Banbury mixer, or in a compounding extruder at an elevated temperature, and hydrolyzes at least some of the alkoxy groups of the alkoxysilane. Some condensation may also occur during the mixing. Furthermore hydrolysis and condensation will continue even after the mixing is completed as evidenced by a further deterioration of the physical properties of the filled composition upon storage and conveniently followed by monitoring the change in melt index The problems associated with highly filled ethylene-vinylalkoxysilane copolymers are widely recognized throughout the industry and is described in European Patent Application 89310667.4 published Apr. 25, 1990.

Several solutions to this problem have been suggested in the prior art; however, none of the proposed solutions have resulted in a totally satisfactory commercial material and/or process to date. One method disclosed in the above-identified European Patent Application requires blending an ethylene-vinyltrialkoxysilane copolymer with a masterbatch containing a second polymer, the filler and silanol condensation catalyst immediately prior to extrusion. Even with this method it is recommended that the copolymer and masterbatch containing the filler be dried before extrusion. It further requires that if the compositions are to be stored, they be stored separately. It does not address or solve the problem of storage of ethylene-vinylalkoxysilane copolymers in combination with fillers.

Another method disclosed in U.S. Pat. No. 4,732,939 involves blending a silane-grafted polymer and an ethylenic polymer consisting mainly of an ethylene-alpha-olefin copolymer and filler. Dilution of the crosslinkable polymer lessens the effects of premature crosslinking and thus renders the filled blends processable. The absence of a free radical generator and catalytic accelerator, however, limits the ability of these blends to achieve satisfactory levels of crosslinking and develop the physical properties necessary for some critical applications. Also, the blend is limited to densities from 0.890 to 0.915 g/cm$^3$ which also limits the utility of these products. For many applications, higher density materials are desirable.

Yet another method disclosed in Japanese Patent Applications 56,163,143, 59,217,750 and 62,184,707 requires that the filled moisture crosslinkable ethylene polymer system be extruded in the absence of condensation catalyst. The extruded product is subsequently immersed in a solution or emulsion of the catalyst. Such a process adds an additional step to the curing operation and makes the practice of moisture crosslinking quite cumbersome.

The addition of water scavengers to the filled moisture crosslinkable polymer systems to prevent crosslinking has also been suggested. Such methods are disclosed in U.S. Pat. No 4,707,520 and European Patent Application 87302899.7 published Nov. 19, 1987.

SUMMARY OF THE INVENTION

It has now unexpectedly been found that relatively high levels of filler can be incorporated into certain very specific hydrolyzable silane copolymers and that the resulting compositions exhibit a desirable balance of good shelf stability and good processability. There is no significant premature crosslinking of these copolymers caused by absorbed water associated with the filler during the compounding step when the filler is dispersed in the silane copolymer, during subsequent storage, or during processing when the filled copolymer is combined and intimately mixed with the silanol condensation catalyst. It is also unexpected and advantageous that these results are obtained without the use of any special drying procedures. Only upon subsequent exposure to water at elevated temperature does crosslinking occur at a reasonable rate.

The fact that ethylene-silane copolymers can be formulated with fillers and the filled products can be retained for subsequent use without a significant change in the physical properties as a result of incipient crosslinking is highly advantageous from the standpoint of the processor. The opportunity for formulating error is significantly reduced when fewer ingredients are combined. Utilizing a silane copolymer composition already containing the filler eliminates the need for elaborate mixing equipment and removes a highly energy intensive and dirty mixing operation from the processor's facility, making it possible for the processor to significantly reduce his production costs.

More specifically, the improved compositions of the present invention are filled hydrolyzable silane copolymer compositions resistant to crosslinking in the absence of a silanol condensation catalyst comprising:
  (a) 20 to 99 weight percent of a random ethylenevinyltriethoxysilane copolymer having a melt index from 0.1 to 50 and from 0.1 to 20 weight percent vinyltriethoxysilane copolymerized; and
  (b) 1 to 70 weight percent of a particulate filler; said composition retaining at least 70 percent of the original melt index when stored under ambient conditions for six months. In another useful embodiment of the invention a rubbery ethylene copolymer is included in the formulation. Ethylene-vinyl acetate copolymers and ethylene-alkylacrylate copolymers are particularly advantageous rubber-like polymers for blending with the ethylene-vinyltriethoxysilane copolymer and filler.

A process is provided for crosslinking filled silane copolymers whereby premature crosslinking and the problems associated therewith during processing are minimized. The process comprises:
  (1) combining (a) a first component containing 20 to 99 weight percent random ethylene-vinyltriethoxysilane copolymer having a melt index from 0.1 to 50 and from 0.1 to 20 weight percent vinyltriethoxysilane copolymerized and 1 to 70 weight percent particulate filler and, optionally, a rubbery ethylene copolymer and (b) a second component not containing alkoxysilane functionality and comprised of an olefin homopolymer or copolymer and 0.25 to 10 weight percent silanol condensation catalyst, based on the weight of the olefin polymer;
  (2) processing the mixture of (a) and (b) to produce a homogeneous blend;
  (3) extruding the mixture to form an extruded article; and
  (4) contacting the extruded article with moisture to effect crosslinking.

Where a rubbery copolymer is utilized, it is especially advantageous in preparing component (a) if the filler is first mixed with the rubbery ethylene copolymer and this mixture then blended with the random ethylene-vinyltriethoxysilane copolymer. The resulting compositions will generally contain 20 to 94 weight percent of the ethylene-vinyltriethoxysilane copolymer, 5 to 70 weight percent of the rubbery copolymer and 1 to 70 weight percent of the filler.

DETAILED DESCRIPTION

This invention relates to filled moisture crosslinkable ethylene polymers and to the process for producing crosslinked compositions useful as insulation materials for electrical conductors and the like.

The significance of this invention lies in the fact that the ethylene-vinyltrialkoxysilane copolymers which are used can be loaded with high levels of particulate fillers and stored for prolonged periods without significant crosslinking and then can be easily processed and formed into objects and crosslinked in the presence of water at elevated temperature. As a result of this invention, properties can now be imparted to moisture crosslinkable ethylene copolymer systems in ways which have not previously been feasible. For example, filled ethylene copolymers can now be made resistant to burning by the addition of substantial levels of hydrated mineral fillers and/or carbon black. It is also envisioned that processable reinforced composites can be produced using these ethylene copolymers.

In their most general terms, the compositions consist of a random copolymer of ethylene and vinyltriethoxysilane of the formula

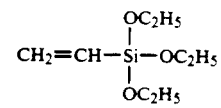

in admixture with a particulate filler material. Random copolymers of ethylene and vinyltrialkoxysilanes are known and the copolymers of this invention can be obtained by copolymerizing ethylene and vinyltriethoxysilane in accordance with any of the known procedures, such as those described in U.S. Pat. No. 3,225,018. Generally, the copolymerization is conducted in the presence of a free radical initiator at high pressure and temperature.

The amount of vinyltriethoxysilane incorporated into the copolymer can range from 0.1 to 20 weight percent and, more preferably, is from 0.5 to 7.5 percent by weight. Quite surprisingly, ethylene homopolymers and copolymers grafted with comparable levels of vinyltriethoxysilane do not exhibit the same resistance to crosslinking in the presence of high filler loadings and are unacceptable for the practice of the present invention.

One or more olefinic monomers may also be present with the ethylene and vinyltriethoxysilane. α-Olefin comonomers are especially useful. When present, these comonomers may constitute up to 20 weight percent of the copolymer but are more preferably present in amounts less than 10 percent Illustrative comonomers which can be copolymerized with the ethylene and vinyltriethoxysilane include: α-olefins such as propylene, butene, hexene and octene; vinyl esters such as vinyl acetate and vinyl butyrate; carboxylic acids and their esters such as methacrylic acid, acrylic acid, methyl acrylate, methyl methacrylate; vinyl ethers such as methyl vinyl ether; acrylonitrile; and the like.

The random ethylene vinyltriethoxysilane polymers utilized for the invention will generally have a melt index from about 0.1 to 50. It is particularly advantageous when the melt index of the ethylene-vinyltriethoxysilane copolymer is from 0.2 to 10. These copolymers will generally have densities greater than 0.910 g/cm$^3$. Formulations based on these latter type of materials find application as wire and cable coatings Melt indexes referred to herein are determined in accordance with ASTM D 1238 and expressed in units of grams/10 minutes It is an aspect of the invention to produce filled compositions resistant to crosslinking during mixing with the particulate filler and when stored under ambient conditions for prolonged periods but which readily cure in the presence of a condensation catalyst and moisture. The filled composition should retain at least about 70 percent of the original melt index when stored under ambient conditions for six months. It is especially advantageous if the retained melt index is 80 percent or more of the original melt index obtained for the filler/silane copolymer composition. As employed herein ambient conditions indicate the usual conditions encountered at processing facilities with no special packaging requirements. Generally, the copolymer is stored in bags or boxes which have a conventional plastic liner of the non-barrier variety, e.g., low density polyethylene. It can also be stored in bulk storage facilities such as railcars, silos, etc.

One or more other ethylene copolymers may be included with the above-described ethylene-vinyltriethoxysilane random copolymers. These ethylene copolymers have a rubber-like character and do not contain silane functionality. As employed herein, terms "rubbery" and "rubber-like" refer to polymers that can be stretched at room temperature to at least twice their original length and, after having been stretched and the stress removed, return to approximately their original length in a relatively short period of time. Such polymers will typically have less than about 30% crystallinity and, more commonly, less than 20% crystallinity as determined by measuring the area of the crystalline melt peak by differential scanning calorimetry (DSC).

Use of a rubbery ethylene copolymer with the ethylene-vinyltriethoxysilane copolymer has been found to be advantageous for certain applications. Most notably, it has been observed that the addition of certain rubbery ethylene copolymers significantly improves the mechanical properties after the crosslinking. Useful rubbery ethylene copolymers include ethylene-vinyl acetate copolymers, ethylene-alkyl acrylate copolymers, and ethylene-α-olefin copolymers. These copolymers will generally have melt indexes from 0.1 to 100 and more preferably, from 0.2 to 10. Densities will typically range from 0.850 to 0.980 g/cm$^2$. Useful vinyl-acetate copolymers will generally contain from 8% to 60% vinyl acetate and, more preferably, from 10% to 50% vinyl acetate. The ethylene-alkyl acrylate copolymers will generally have from 1% to 50% and, more preferably, from 5% to 50% alkyl acrylate copolymerized. Ethylene-ethyl acrylate and ethylene-n-butyl acrylate copolymers are particularly useful. Ethylene-α-olefin copolymers can contain from about 7% to 80% α-olefin having from 3 up to about 8 carbon atoms. Most commonly used α-olefins include propylene, butene-1 and hexene-1 and mixtures thereof. When the α-olefin is propylene, it will be typically present in an amount from about 20% to 80%, whereas the higher α-olefins are generally employed in an amount from about 7% to 40%.

The random ethylene-vinyltriethoxysilane copolymer will comprise from about 20 to 99 weight percent of the composition and, more usually, from about 40 to 95 weight percent of the composition. The particulate filler will comprise from 1 to 70 weight percent and, more usually, from 5 to 60 weight percent of the composition. When an optional non-silane containing rubbery ethylene copolymer is included, the composition will typically contain 20 to 94 weight percent ethylene-vinyltriethoxysilane copolymer, 5 to 70 weight percent rubbery ethylene copolymer and 1 to 70 weight percent filler. Particularly advantageous compositions are comprised of 40 to 80 weight percent ethylene-vinyltriethoxysilane copolymer, 10 to 60 weight percent rubbery ethylene copolymer and 10 to 60 weight percent filler.

Particulate fillers which can be utilized for the purpose of this invention and commonly used include any of the conventional fillers (sometimes referred to as reinforcing agents) known in the art. These agents are widely utilized to enhance polymer properties for specific applications and the type and amount of filler will be governed by the end use application of the formulated product. Examples of useful particulate fillers include carbon black, aluminum trihydrate, calcium carbonate, calcium silicate, magnesium carbonate, magnesium hydroxide, aluminum silicate, talc, silica, mica, gypsum, zeolite, kaolin, clays and the like. Carbon black, aluminum trihydrate, and magnesium hydroxide are the most commonly used fillers for the present invention. It should be understood that mixtures of one or more of the above-mentioned particulate fillers can also be employed.

In a further modification, one or more antioxidants may also be present with the filled ethylene-vinyltriethoxysilane coposition. Antioxidants which can be employed are any of those generally utilized for ethylene polymers. The amount and type of antioxidant or antioxidant package will vary depending on the intended application of the finished product. If desired, additional antioxidants of the same or different type may be added with the silanol condensation catalyst. Useful antioxidants generally include the hindered phenols, thio compounds and polymerized dihydroquinolines. Illustrative antioxidants include: tetrakis[methylene 3-(3',5'-di-tertbutyl-4-hydrocinnamate)]methane, thiodiethylene bis-(3,5-ditertbutyl-4-hydroxy hydrocinnamate), n-octadecyl-β-(3,5-ditertbutyl-4-hydroxyphenyl)propionate, distearylthiodipropionate, dilaurylthiodipropionate, polymerized 1,2-dihydro-2,2,4-trimethylquinoline, and the like. The amount of antioxidant(s) can range from about 0.01 up to 1 weight percent of the filled composition.

The filler is incorporated (dispersed) in the polymer composition utilizing conventional batch or continuous methods known to the art such as mixing on a mill or in a mixer such as a Banbury, Brabender or Henschel mixer, or continuous mixer such as single or twin screw compounding extruders.

To crosslink the above-described compositions which contain filler, hydrolyzable ethylene-vinyltriethoxysilane copolymer and any optional rubbery ethylene copolymer(s) and/or antioxidant(s), referred to hereafter as the first hydrolyzable silane copolymer component or simply the first component, it is combined with a second composition containing a silanol condensation catalyst and blended therewith using conventional processing equipment. The latter catalyst-containing composition, referred to herein as the second component, consists of a blend of the silanol condensation catalyst in an olefin polymer which does not contain hydrolyzable alkoxysilane functionality. The olefin polymer used for the second component may be the same as the ethylene copolymers previously described as being suitable for blending with the ethylene-vinyl-triethoxysilane copolymer or it may be different. The olefin polymer, which functions as the carrier for the silanol condensation catalyst and facilitates blending, need not have rubber-like character. It may also be a highly crystalline polymer. If the olefin polymer utilized as a carrier for the silanol condensation catalyst is not a rubbery ethylene copolymer of the type previously described, it will constitute less than 20 weight percent and more preferably, less than 15 weight percent of the total composition. The second component may also contain other additives which are to be included in the formulation.

The first and second components are intimately mixed to obtain a homogeneous blend and then extruded and contacted with moisture, preferably at an elevated temperature, to effect crosslinking. The mixing and extrusion can be carried out in a single operation, e.g., if the extruder has one or more mixing zones, or the two components can be blended in a mixer and subsequently fed to the extruder. By selecting a carrier resin for the second component having good processing characteristics and which is highly compatible with the ethylene-vinyltriethoxysilane copolymer, the blending operation can be greatly facilitated. An important feature of the present invention is that significant crosslinking which can make the formulation difficult or impossible to extrude and which can produce unacceptable extrudate surface appearance is minimized or virtually eliminated.

The second component will contain from about 0.25 to about 10 weight percent silanol condensation catalyst based on the weight of the olefin polymer. Especially useful compositions are obtained when the amount of silanol condensation catalyst ranges from about 0.5 to about 5 weight percent. The olefin homopolymer or copolymer serves as a carrier for the silanol condensation catalyst and facilitates addition to and blending with the filled hydrolyzable silane copolymer component. In general, any homopolymer or copolymer can be used which is compatible with the ethylene-vinyltriethoxysilane copolymer and which does not contain any alkoxysilane groups which are hydrolyzable under the prevailing conditions. These are primarily homopolymers and copolymers of ethylene such as low density polyethylene, linear low density polyethylene and high density polyethylene; propylene homopolymers and copolymers such as polypropylene and ethylene-propylene copolymers (random and block); and copolymers of ethylene with vinyl acetate, ethyl acrylate, methyl acrylate and the like. Mixtures of two or more of these polymers can also be effectively used. The melt index of the olefin homopolymer/copolymer carrier resin can be higher than, lower than or substantially the same as the melt index of the ethylene-vinyltriethoxysilane copolymer. When the first component is comprised of a rubbery ethylene copolymer, an ethylene-vinyltriethoxysilane copolymer and filler, it may be advantageous to utilize the same ethylene copolymer as the carrier resin for the second component; however, this is not necessary.

The amount of the second component added to the first component will be sufficient to introduce the amount of silanol condensation catalyst necessary to effect cure. This, of course, will vary depending on the amount of vinyl triethoxysilane copolymerized and the amount of silanol condensation catalyst which is combined with the carrier resin of the second component. Most generally, the hydrolyzable silane copolymer component will comprise from 70 to 99 weight percent of the blend and the second component will constitute from 1 to 30 weight percent of the blend. Formulations containing from 85 to 95 weight percent of the silane component and 5 to 15 weight percent of the second component containing the silanol condensation catalyst and other additives are particularly advantageous.

Numerous silanol condensation catalysts are known in the art for crosslinking alkoxysilane polymers and can be employed for the present invention. These catalysts generally include organic bases, carboxylic acids, and organometallic compounds including organic titanates and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate; and the like. Tin carboxylates, especially dibutyltin dilaurate and dioctyltin maleate, are particularly effective for this invention.

The compositions of this invention can contain other additives conventionally employed in formulations of this type. Such additives are known in the art and are generally present in such amounts cumulatively not exceeding 15 percent by weight, based on the total composition. Such additives include antioxidants, UV stabilizers, release agents, processing aids, nucleating agents, colorants, pigments, metal deactivators, lubricants, other polymers, and the like. While these additives can be incorporated into either component, it is convenient to prepare a masterbatch of the additives with the silanol condensation catalyst in the carrier resin. While the first component will contain the bulk of the filler, additional filler of the same or different type can be combined with the carrier resin and silanol condensation catalyst.

It has been found to be highly advantageous to include a rubbery ethylene copolymer with the ethylene-vinyltriethoxysilane copolymer and filler. These compositions are not only storage stable and resistant to premature crosslinking but also, upon curing in accordance with the process of the invention, produce products which exhibit superior mechanical properties. While the cured formulations which do not contain a rubbery copolymer are useful for a variety of applications, they may be excluded from use in those critical applications where high tensile strengths and high elongations are required. By including a rubbery ethylene copolymer, most notably, ethylene-vinyl acetate copolymers, ethylene-alkyl acrylate copolymers, and ethylene-α-olefin copolymers, it is possible to produce crosslinked formulations which have a superior balance of tensile and elongation properties. In certain wire and cable applications, for example, elongations greater than 250% and tensile strengths greater than 1800 psi are required. With the incorporation of a rubbery ethylene copolymer into the first component it is possible to meet and very often exceed these requirements. Elongations of 300% or higher and tensiles of 2000 psi or higher are typically acheived when a rubbery copolymer, such as ethylene-vinyl acetate, is included in the formulation.

When a rubbery ethylene copolymer is employed, the filler can be combined with the ethylene-vinyltriethoxysilane copolymer and the EVA then added or the rubbery ethylene copolymer, the ethylene-vinyl- trimethoxysilane copolymer, and the filler may be charged at the same time and mixed. It has quite unexpectedly been discovered that significantly improved physical properties can be obtained when the filler is first combined with the rubbery ethylene copolymer and, after thorough mixing, the ethylene- vinyltriethoxysilane copolymer then incorporated. This composition is then combined with the second component and mixed and extruded in accordance with the previously described procedures.

The invention is more fully illustrated by the following examples. All parts and percentages referred to in the examples are given in a weight basis unless otherwise indicated. Cure data presented in the examples was determined by measuring the torque (lb-in) on 75 mil thick compression molded plaques with a Monsanto Oscillating Disc Rheometer (ODR) operating at 360° F. and +/−5° arc. Samples were cured by immersing in a 95° C. water bath for a specified period of time. High ODR torque values indicate increased levels of crosslinking. Tensile properties were determined using an Instron Tensile Tester in accordance with ASTM D 638.

EXAMPLE I

An ethylene-vinyltriethoxysilane (EVTEOS) random copolymer, density 0 926 gm/cm$^3$, melt index 5, having 4.1% vinyltriethoxysilane (VTEOS) copolymerized was compounded with carbon black in a Banbury mixer. The compounded copolymer (identified as IA) contained 73.65% EVTEOS copolymer, 26.0% ASTM grade N990 carbon black, and 0.35% antioxidant (polymerized 1,2-dihydro-2,2,4-trimethylquinoline). A composition (identified as IB) containing 79.7% low density polyethylene (melt index 2.2), 17.5% ASTM grade N110 carbon black, 1.4% dibutyltindilaurate (DBTDL) and 1.4% antioxidant (Irganox ® 1010) was also prepared. The filled EVTEOS copolymer composition IA (92.5 parts) was combined with 7.5 parts IB in a Brabender Plasticorder mixer to obtain a homogeneous blend (identified as IC). This product is readily extrudable onto wire to provide a tough durable insulation coating after crosslinking by exposing to moisture.

Compression molded plaques of IA, IB, and IC were prepared and the torque determined. Specimens of IC were also cured in water for 8 hours and 24 hours. Cure data obtained were as follows:

| Sample | Torque (lb-in) |
| --- | --- |
| IA | 1.5 |
| IB | 2 |
| IC (uncured) | 3 |
| IC (8 hr. cure) | 20 |
| IC (24 hr. cure) | 22.5 |

Based on the low torque values observed for IB and IC (uncured) it is apparent that very little crosslinking occurs during compounding EVTEOS copolymer and the filler or during processing of the filled EVTEOS copolymer with the masterbatch containing the DBTDL silanol condensation catalyst. High levels of crosslinking are achieved, however, upon moisture cure as evidenced by the high torque values.

To demonstrate the ability of the filled EVTEOS copolymer compositions to resist incipient crosslinking, pellets of product IA were stored under ambient conditions in a liner-grade polyethylene plastic bag for 23 weeks. The melt index of the composition at the beginning of the storage period was 0.67 and after 23 weeks storage the melt index was 0.57. This represents a 15% decrease in melt index which is considered to be within acceptable processing limits.

EXAMPLE II

To demonstrate the versatility of the invention, Example I was repeated except that a different EVTEOS copolymer was used and the amount of masterbatch was varied. The EVTEOS copolymer used for the formulation had a melt index of 5 and contained 1.9% copolymerized VTEOS. Eighty-five parts of the filled copolymer were combined with 15 parts of the masterbatch containing the DBTDL catalyst to obtain the crosslinkable compositions. Torque values were obtained for each of the components used to obtain the composition and for the resulting formulation before and after cure. Results were as follows:

| Sample | Torque (lb-in) |
| --- | --- |
| EVTEOS Copolymer | 1.5 |
| Filled EVTEOS Copolymer | 2 |
| Filled EVTEOS Copolymer + Masterbatch: | |
| Uncured | 3 |
| Cured 8 hours | 16 |
| Cured 24 hours | 23 |

The melt index of the filled EVTEOS copolymer was 1.23. After storage for 23 weeks, the melt index was 1.04—a decrease of only 15.4%.

To further illustrate the resistance of the filled EVTEOS copolymers to hydrolysis and crosslinking they were subjected to an even more stringent test. In this test a compression molded 75 mil plaque of the filled copolymer (73.7 parts copolymer, 26.0 parts carbon black and 0.3 parts antioxidant) was immersed in a 95° C. water bath for 24 hours. The torque of the test specimen only increased from 2 lb-in to 3.5 lb-in upon such exposure. This clearly demonstrates the superior resistance to crosslinking obtained with the filled compositions of this invention in the absence of silanol condensation catalyst.

EXAMPLE III

A carbon black filled formulation prepared using a mixture of EVTEOS copolymer (melt index 5; density 0.926 g/cm$^3$; 4.1% VTEOS) and a rubbery ethylene-vinyl acetate (EVA) copolymer (melt index 2.2; density 0.940 g/cm$^3$; 19% VA) was combined with a masterbatch comprised of 92% EVA, 4% DBTDL and 4% Irganox ® 1010. The fully formulated crosslinkable composition was comprised as follows:

| | |
| --- | --- |
| EVTEOS copolymer | 54.5% |
| EVA copolymer | 19.5% |
| Carbon Black (ASTM N990) | 21.0% |
| Masterbatch | 5.0% |

The uncured formulation had an ODR torque value of 5.5 lb-in. After immersing in a 95° C. water bath for 8 and 24 hours, the torque values were 20 and 26 lb-in, respectively, indicating the presence of a substantial amount of crosslinking.

EXAMPLES IV-IX

Moisture crosslinkable formulations were prepared utilizing a variety of different fillers. The compositions were prepared by first dispersing the filler in the EVTEOS copolymer and then blending the filled copolymer composition with a masterbatch containing the silanol condensation catalyst in a Brabender Plasticorder mixer. The EVTEOS copolymer used for these formulations had a melt index of 5, density of 0.926 gm/cm$^3$, and contained 4.1% copolymerized VTEOS. The masterbatch used was the same as employed in Example I. Compositional details and ODR torque values are reported in Table I. N.D. in the table signifies that the value was not determined.

It can be seen from the data that a variety of fillers can be mixed into EVTEOS copolymers without inducing significant crosslinking during processing even in the presence of the silanol condensation catalyst. It is further apparent from the data that while the amount of premature crosslinking obtained during compounding and processing is slightly higher than that obtained with the formulations of Examples I-III containing carbon black alone, sufficient silanol functionality remains to effect a high degree of crosslinking upon subsequent moisture cure. To further illustrate the utility of these formulations, the melt index of the product of Example IV which utilized alumina trihydrate as the filler was monitored to determine its storage stability. The initial melt index of the filled EVTEOS product was 2.06. After 24 weeks storage under ambient conditions the melt index was 2.35.

TABLE I

| | EXAMPLES | | | | | |
|---|---|---|---|---|---|---|
| | IV | V | VI | VII | VIII | IX |
| EVTEOS Copolymer | 59.5 | 59.5 | 59.5 | 59.5 | 59.5 | 59.5 |
| Alumina Trihydrate | 25.5 | — | — | — | — | — |
| Talc | — | 25.5 | — | — | — | — |
| Magensium Carbonate | — | — | 25.5 | — | — | — |
| Burgess KE Clay | — | — | — | 25.5 | — | — |
| Wollastonite | — | — | — | — | 25.5 | — |
| Mica | — | — | — | — | — | 25.5 |
| Carbon Black (ASTM N110) | 2.6 | 2.6 | 2.6 | 2.6 | 2.6 | 2.6 |
| DBTDL | 0.2 | 0.2 | 0.2 | 0.2 | 0.2 | 0.2 |
| Irganox ® 1010 | 0.2 | 0.2 | 0.2 | 0.2 | 0.2 | 0.2 |
| Low Density Polyethylene | 12.0 | 12.0 | 12.0 | 12.0 | 12.0 | 12.0 |
| Torque Values (lb-in): | | | | | | |
| EVTEOS | 1.5 | 1.5 | 1.5 | 1.5 | 1.5 | 1.5 |
| EVTEOS + filler | 2 | N.D. | N.D. | N.D. | N.D. | N.D. |
| Formulated Product: | | | | | | |
| Uncured | 11 | 5 | 8.5 | 8.5 | 8.5 | 7 |
| 8 Hour Cure | 20 | 24.5 | N.D. | N.D. | N.D. | N.D. |
| 16 Hour Cure | 25 | N.D. | 28 | 34 | 33.5 | 35 |
| 24 Hour Cure | N.D. | 32.5 | N.D. | N.D. | N.D. | N.D. |

COMPARATIVE EXAMPLES I-III

The unexpected hydrolytic stability of filled random EVTEOS copolymers is demonstrated by the following comparative examples wherein filled compositions based on grafted EVTEOS polymers are prepared and evaluated. The copolymers employed for these comparative examples were obtained by grafting VTEOS onto polyethylene in accordance with the general procedure described in U.S. Pat. No. 3,646,155. The formulated products were prepared by first dispersing the filler in the EVTEOS graft copolymer and then blending 85 parts of the resulting filled copolymer composition with 15 parts of a masterbatch containing the silanol condensation catalyst. The mixing procedures and masterbatch employed were the same as described for Example I. The formulations are set forth in the table which follows along with the ODR torque values obtained for the uncured and cured composition.

| | COMPARATIVE EXAMPLES | | |
|---|---|---|---|
| | I | II | III |
| EVTEOS graft copolymer | 59.5[1] | 59.5[2] | 59.5[3] |
| Alumina trihydrate | 25.5 | 25.5 | 25.5 |
| Carbon Black (ASTM N110) | 2.6 | 2.6 | 2.6 |
| DBTDL | 0.2 | 0.2 | 0.2 |
| Irganox ® 1010 | 0.2 | 0.2 | 0.2 |
| Low Density Polyethylene | 12.0 | 12.0 | 12.0 |
| Torque Values (lb-in): | | | |
| Uncured | 1 | 2.5 | 12 |
| 16 Hour Cure | 11 | 16 | 28 |

[1]MI = 1.0; 1.2% grafted VTEOS
[2]MI = 0.2; 1.2% grafted VTEOS
[3]MI = <0.1; 1.7% grafted VTEOS It is apparent from the above data that unacceptably low levels of cure are obtained after 16 hours for Comparative products I and II formulated using the graft copolymer. For example, the product of Example II similarly formulated using a copolymer having a similar amount of VTEOS randomly polymerized achieved the same level of cure in only half the time. While the 16 hour cure obtained for the Comparative product III was acceptable, significant crosslinking occurred during the processing operation, i.e., during the blending of the filled copolymer component with the masterbatch, which results in a product which is difficult to extrude and which has unacceptable surface appearance.

COMPARATIVE EXAMPLES IV AND V

To further demonstrate the unacceptability of closely related compositions, ethylene-vinyltrimethoxysilane (EVTMOS) copolymers were prepared both by random copolymerization of ethylene and vinyltrimethoxysilane (VTMOS) and by grafting the silane monomers onto polyethylene. The methods employed to prepare these copolymers were the same as utilized for the EVTEOS. The EVTMOS random copolymer used had a melt index of 0.6 and contained 2.1% copolymerized VTMOS. The EVTMOS graft copolymer had a melt index of 0.5 and had 1.6% VTMOS grafted. Formulated products were prepared using the EVTMOS copolymers in accordance with the procedure of this invention by first dispersing the filler (alumina trihydrate) in the copolymer and then subsequently blending the resulting filled copolymer composition (85 parts) with 15 parts of the masterbatch of Example I containing DBTDL silanol condensation catalyst. The formulations and ODR torque values are set forth in the table which follows.

| | COMPARATIVE EXAMPLES | |
|---|---|---|
| | IV | V |
| EVTMOS graft copolymer | 59.5 | — |
| EVTMOS random copolymer | — | 59.5 |
| Alumina Trihydrate | 25.5 | 25.5 |
| Carbon Black (ASTM N110) | 2.6 | 2.6 |
| DBTDL | 0.2 | 0.2 |

|  | COMPARATIVE EXAMPLES | |
|---|---|---|
|  | IV | V |
| Irganox ® 1010 | 0.2 | 0.2 |
| Low Density Polyethylene | 12.0 | 12.0 |
| Torque Values (lb-in): | | |
| Uncured | 47 | 28 |
| 8 Hour Cure | N.D. | 45 |
| 16 Hour Cure | N.D. | N.D. |
| 24 Hour Cure | 39 | 48 |

It is apparent from the above data both the formulation prepared using the EVTMOS graft copolymer and the formulation prepared using EVTMOS random copolymer became highly crosslinked during the processing of the filled copolymer containing the silanol condensation catalyst. In fact, the product of Comparative Example IV was completely cured during the processing operation. The decrease in torque observed after 24 hour cure for this sample is believed to be due to excessive embrittlement of the sample resulting from the high degree of crosslinking. While additional water cure was achieved with Comparative Product V, the high level of premature crosslinking would make the composition virtually impossible to extrude at an acceptable rate while maintaining acceptable extrudate quality.

EXAMPLE X

To demonstrate the further advantages obtained when rubbery ethylene copolymers are included with the EVTEOS the following composition was prepared:

| EVTEOS Copolymer | 54.2% |
|---|---|
| EVA Copolymer | 23.5% |
| Carbon Black (ASTM N990) | 19.1% |
| Carbon Black (ASTM N110) | 2.5% |
| DBTDL | 0.2% |
| Antioxidants | 0.5% |

The above formulation was obtained by blending 73.65 parts EVTEOS copolymer (melt index 5; density 0.926; 1.9% VTEOS), 26.0 parts carbon black (ASTM N990) and 0.35 parts polymerized 1,2-dihydro-2,2,4-trimethylquinoline in a Banbury mixer. An amount of this mixture (86.5 parts) was blended with 13.5 parts EVA copolymer (melt index 2.2; density 0.940; 19% VA) using a Brabender Plasticorder mixer to obtain a first component which was resistant to incipient crosslinking upon storage under ambient conditions. The fully formulated crosslinkable product was then obtained by blending 85 parts of the first component and 15 parts of a second component comprised of 79.7 parts EVA, 17.5% carbon black (ASTM N110), 1.4 parts DBTDL and 1.4 parts (Irganox ® 1010) in a Brabender Plasticorder mixer.

The fully formulated mixture containing the silanol condensation catalyst was compression molded into 1.9 mil (0.075 inch) thick plaques and cured in a 95° C. water bath for 24 hours. The ODR torque value of the cured product was 21 lb-in. Uncured plaques had ODR torque values of 7 lb-in. The cured product had a tensile strength at break of 1730 psi and elongation at break of 233%.

The above tensile and elongation values are significantly higher than obtained with formulations which do not include the rubbery ethylene copolymer. For example, when a formulation was prepared omitting the EVA copolymer in the first component and substituting low density polyethylene (melt index 2.2; density 0.918 gm/cm$^3$) for the EVA in the second component, the resulting composition was resistant to crosslinking during processing; however, after cure (95° C. for 24 hours) the tensile and elongation values were 1815 psi and 50%, respectively. The low elongation at break limits utility of the products and precludes use for many wire and cable insulation applications.

COMPARATIVE EXAMPLES VI AND VII

To further demonstrate the improved results obtained by the inclusion of a rubbery component in the formulations of the invention, Example X was repeated except that for the formulation of the first component the EVA copolymer was replaced with a crystalline ethylene polymer. In Comparative Example VI low density polyethylene (melt index 2.2; density 0.918 gm/cm$^3$) was substituted for the EVA and in Comparative Example VII the EVA was replaced with high density polyethylene (melt index 7.0; density 0.95 gm/cm$^3$). In both instances, the resin used in the second component as a carrier for the silanol condensation catalyst was low density polyethylene. The compositions were comprised as follows:

|  | COMPARATIVE EXAMPLE VI | COMPARATIVE EXAMPLE XII |
|---|---|---|
| EVTEOS Copolymer | 54.2% | 54.2% |
| LDPE | 23.5% | 12.1% |
| HDPE | — | 11.4% |
| Carbon Black | 21.6% | 21.6% |
| DBTDL | 0.2% | 0.2% |
| Antioxidants | 0.5% | 0.5% |

While both formulations were resistant to crosslinking during processing, as evidenced by the low torque value obtained for the uncured product, elongation properties were significantly lower than obtained with the formulation of Example X containing a rubbery ethylene copolymer after cure. Torque values, tensile strengths and elongations obtained for the products were as follows:

|  | COMPARATIVE EXAMPLE VI | COMPARATIVE EXAMPLE VII |
|---|---|---|
| Torque Value (lb-in): | | |
| Uncured | 6 | 10 |
| Cured 24 hours at 95° C. | 23.5 | 24 |
| Tensile Strength (psi) | 2030 | 1950 |
| Elongation (%) | 43 | 55 |

EXAMPLE XI

Example X was repeated except that a mixture of EVA copolymers was employed. Approximately one-half of the 19% VA copolymer was replaced with an EVA copolymer containing 29% VA and having a melt index of 3.5 and density of 0.950. The cured product had a tensile strength at break of 1920 psi and elongation at break of 295%. ODR torque values obtained for cured and uncured samples were 21 lb-in and 8 lb-in, respectively.

EXAMPLE XII

Example X was repeated using a different EVTEOS copolymer. The EVTEOS copolymer contained 4.1% randomly copolymerized VTEOS and had a melt index of 5 and density of 0.926. The composition of the final fully formulated product was as follows:

| EVTEOS Copolymer | 54.4% |
|---|---|
| EVA Copolymer | 26.4% |
| Carbon Black (ASTM N990) | 16.2% |
| Carbon Black (ASTM N110) | 2.6% |
| DBDTL | 0.2% |
| Irganox ® 1010 | 0.2% |

Upon cure (24 hours) the composition had a tensile strength at break of 2510 psi and elongation at break of 282%. ODR torque values obtained for the uncured and cured (24 hours) were 6 lb-in and 23 lb-in, respectively, indicating minimal crosslinking during processing. Furthermore, the first component used to obtain the final product exhibited excellent storage stability under ambient conditions.

To demonstrate the utility of the above-prepared formulation, the product was extruded on a 2½ inch Davis Standard extruder to produce insulated 14 AWG copper wire having a coating thickness of 30 mil (0.03 inch). The extruder had four electrically heated zones and an air-cooled barrel. Temperatures within heated zones 1–4 were 145° C., 160° C., 170° C., and 180° C., respectively. The head temperature was 180° C. and the screw speed was maintained at 21 rpm. Line speed and head pressure were maintained at 200 ft/min and 3700 psi, respectively. The extrudate had excellent surface appearance—it was smooth and free of any surface imperfections such as are observed when premature crosslinking occurs.

EXAMPLES XII AND XIV

To demonstrate the ability to vary the formulations the following compositions were prepared:

|  | EX. XII | EX. XIV |
|---|---|---|
| EVTEOS Copolymer (MI 5; 4.1% VTEOS) | 54.2% | 46.8% |
| EVA Copolymer (MI 22; 19% VA) | 26.6% | 30.0% |
| Carbon Black (ASTM N990) | 16.0% | 19.9% |
| Carbon Black (ASTM N110) | 2.6% | 2.6% |
| DBTDL | 0.2% | 0.2% |
| Antioxidant | 0.4% | 0.5% |

The compositions were prepared utilizing a procedure wherein the EVA copolymer, a portion of the carbon black and antioxidant were first blended and then mixed with the EVTEOS copolymer. This mixture was then blended with the second component which is a premix of silanol condensation catalyst, additional carbon black and additional antioxidant in the same EVA copolymer. Physical properties and torque values obtained for the resulting formulations were as follows:

|  | EX. XII | EX. XIV |
|---|---|---|
| Torque Value (lb-in): |  |  |
| Uncured | 6 | 6 |
| Cured 24 hours at 95° C. | 23 | 22.5 |
| Tensile Strength (psi) | 2190 | 2280 |
| Elongation (%) | 325 | 292 |

It is apparent from the above data that the products were resistant to crosslinking upon processing and that after cure good physical properties were developed. The tensile strength and elongation values obtained indicate suitability for wire and cable insulation applications.

EXAMPLE XV

The ability to include a limited amount of a crystalline polymer with the rubbery ethylene copolymer is demonstrated by the following example wherein the following composition was prepared:

| EVTEOS Copolymer | 54.4% |
|---|---|
| EVA Copolymer | 14.6% |
| LDPE (MI 2.2; density 0.918) | 13.5% |
| Carbon Black (ASTM N990) | 16.0% |
| Carbon Black (ASTM N110) | 1.3% |
| DBTDL | 0.1% |
| Irganox ® 1010 | 0.1% |

The EVTEOS copolymer used contained 2.2% randomly copolymerized VTEOS and had a melt index of 1.0. The EVTEOS was mixed with a preblend of the carbon black, antioxidant and EVA copolymer and this mixture then combined with a premix containing the low density polyethylene (LDPE) and silanol condensation catalyst. The premix was comprised of 79.7% LDPE, 17.5% carbon black, 1.4% DBTDL and 1.4% Irganox ® 1010. 7.5 Parts of the premix were combined with 85 parts of the first mixture and 7.5 parts LDPE to arrive at the final composition. Torque values and physical properties obtained for the resulting product were as follows:

| Torque Value (lb-in): |  |
|---|---|
| Uncured | 5.5 |
| Cured 24 hours at 95° C. | 16 |
| Tensile Strength (psi) | 2110 |
| Elongation (%) | 405 |

The level of cure was also demonstrated using the Hot Creep Test Method (ICEA T-28-562). In this test, values less than 100% are considered to be fully cured. Values obtained for the above formulation after curing for 8 and 24 hours were 70% and 65%, respectively.

EXAMPLES XIV-XVIII

Additional compositions were prepared utilizing the EVTEOS copolymer of Example I. For these formulations the rubbery copolymer used was either EVA (melt index 3.5; 29% VA) or a copolymer of ethylene and n-butylacrylate (melt index 3.0; 5% n-butylacrylate). The compositions were filled with talc or magnesium carbonate and a small amount of carbon black. Formulations were prepared in accordance with the procedure of Example X by blending 85 parts of a first component consisting of a mixture of the EVTEOS copolymer, the EVA or EnBA copolymer and the mineral filler with 15 parts of a second component consisting of a premix of the silanol condensation catalyst, carbon black and antioxidant in EVA (melt index 2.2; 19% VA). The fully formulated compositions and physical properties obtained therefor are identified below:

|  | EX. XV | EX. XVII | EX. XVIII |
|---|---|---|---|
| EVTEOS Copolymer | 57.0% | 57.0% | 57.0% |
| EVA Copolymer (29% VA) | 18.0% | — | 18.0% |
| EnBA Copolymer | — | 18.0% | — |
| EVA Copolymer (19% VA) | 12.0% | 12.0% | 12.0% |

-continued

| | EX. XV | EX. XVII | EX. XVIII |
|---|---|---|---|
| Talc | 10.0% | 10.0% | — |
| Magnesium Carbonate | — | — | 10.0% |
| Carbon Black (ASTM N110) | 2.6% | 2.6% | 2.6% |
| DBTDL | 0.2% | 0.2% | 0.2% |
| Antioxidant | 0.2% | 0.2% | 0.2% |
| Torque Value (lb-in): | | | |
| Uncured | 4.5 | 4.5 | 10 |
| Cured 24 hours at 95° C. | 24.5 | 27.5 | 28 |
| Tensile Strength (psi) | 2115 | 2020 | 1865 |
| Elongation (%) | 288 | 207 | 216 |

EXAMPLE XIX

A product was prepared corresponding to the following composition:

| | |
|---|---|
| EVTEOS Copolymer (4.1% VTEOS) | 54.4% |
| EVA Copolymer (19% VA) | 29.2% |
| Carbon Black (ASTM N990) | 15.9% |
| DBTDL | 0.2% |
| Antioxidant | 0.3% |

The above formulation was prepared in accordance with the procedure described in Example X except that the second component, i.e., the silanol condensation catalyst premix, did not contain any filler. The catalyst premix contained 96.5% EVA, 1.4% DBTDL and 2.1% antioxidant (polymerized 1,2-dihydro-2,2,4-trimethylquinoline). No processing problems were observed with the formulation and the resulting product, after curing for 24 hours at 95° C. in water, had a tensile strength of 2295 psi and elongation of 297%.

We claim:

1. A filled, pelletized hydrolyzable silane copolymer composition consisting essentially of:
   (a) 20 to 94 weight percent random ethylene-vinyltriethoxysilane copolymer having a melt index from 0.1 to 50 and from 0.1 to 20 weight percent copolymerized vinyltriethoxysilane;
   (b) 5 to 70 weight percent rubber ethylene copolymer having a melt index from 0.1 to 100 and less than about 30% crystallinity selected from the group consisting of ethylene-vinyl acetate copolymer, ethylene-alkyl acrylate copolymer, and ethylene-α-olefin copolymer; and
   (c) 1 to 70 weight percent particulate filler; said filled, pelletized composition retaining at least 70% of the original melt index upon storage under ambient conditions for six months in the absence of a silanol condensation catalyst but capable of being crosslinked by the action of water in the presence of a silanol condensation catalyst to a tensile strength greater than 1800 psi and elongation greater than 250 percent.

2. The filled hydrolyzable silane copolymer composition of claim 1 which additionally contains from 0.01 to 1 weight percent antioxidant.

3. The filled hydrolyzable silane copolymer composition of claim 1 wherein the ethylene-vinyl acetate copolymer contains from 8 to 60 percent vinyl acetate, the ethylene-alkyl acrylate copolymer contains from 5 to 50 percent alkyl acrylate and the ethylene-α-olefin copolymer contains from about 7 to 80 percent $C_{3-8}$ α-olefin.

4. The filled hydrolyzable silane copolymer composition of claim 3 wherein the random ethylene-vinyltriethoxysilane copolymer has a melt index from 0.2 to 10 and contains from 0.5 to 7.5 weight percent copolymerized vinyltriethoxysilane.

5. The filled hydrolyzable silane copolymer composition of claim 4 which contains from 40 to 80 weight percent ethylene-vinyltriethoxysilane copolymer, 10 to 60 weight percent rubbery ethylene copolymer, and 10 to 60 weight percent filler.

6. The filled hydrolyzable silane copolymer composition of claim 5 wherein the rubbery ethylene copolymer is an ethylene-vinyl acetate copolymer containing from 10 to 50 percent vinyl acetate.

7. The filled hydrolyzable silane copolymer composition of claim 6 wherein the filler is selected from the group consisting of carbon black, aluminium trihydrate, magnesium hydroxide or mixtures thereof.

8. The filled hydrolyzable silane copolymer composition of claim 7 which contains 0.01 to 1 weight percent antioxidant selected from the group of tetrakis[methylene 3-(3',5'-ditertbutyl-4-hydrocinnamate)]methane, thiodiethylene bis-(3,5-ditertbutyl-4-hydroxyhydrocinnamate), n-octadecyl-β-(3,5-ditertbutyl-4-hydroxyphenyl)propionate, distearylthiodipropionate, dilaurylthiodipropionate, and polymerized 1,2-dihydro-2,2,4-trimethylquinoline.

9. The filled hydrolyzable silane copolymer composition of claim 5 wherein the rubbery ethylene copolymer is an ethylene n-butyl acrylate copolymer containing 5 to 50 percent n-butyl acrylate.

10. The filled hydrolyzable silane copolymer composition of claim 9 wherein the filler is selected from the group consisting of carbon black, aluminum trihydrate, magnesium hydroxide or mixture thereof.

11. The filled hydrolyzable silane copolymer composition of claim 10 which contains 0.01 to 1 weight percent antioxidant selected from the group of tetrakis[methylene 3-(3',5'-ditertbutyl-4-hydrocinnamate)]methane, thiodiethylene bis-(3,5-ditertbutyl-4-hydroxyhydrocinnamate), n-octadecyl-β-(3,5-ditertbutyl-4-hydroxyphenyl)propionate, distearylthiodipropionate, dilaurylthiodipropionate, and polymerized 1,2-dihydro-2,2,4-trimethylquinoline.

12. A process for crosslinking a filled hydrolyzable silane copolymer composition comprising:
   (1) combining (a) a first component containing 20 to 94 weight percent random ethylene-vinyltriethoxysilane copolymer having a melt index from 0.1 to 50 and from 0.1 to 20 weight percent vinyltriethoxysilane copolymerized, 5 to 70 weight percent rubbery ethylene copolymer having a melt index from 0.1 to 100 and crystallinity less than about 30% selected from the group consisting of ethylene-vinyl acetate copolymer, ethylene-alkyl acrylate copolymer, and ethylene-α-olefin copolymer, and 1 to 70 weight percent particulate filler and (b) a second component comprising an olefin polymer and 0.25 to 10 weight percent silanol condensation catalyst, based on the weight of the olefin polymer;
   (2) processing the mixture of (a) and (b) to produce a homogenous blend;
   (3) extruding the homogeneous blend to form an extruded article; and
   (4) contacting the extruded article with moisture to effect crosslinking.

13. The process of claim 12 wherein the ethylene-vinyltriethoxysilane copolymer of the first component contains from 0.5 to 7.5 weight percent copolymerized vinyltriethoxysilane and has a melt index of 0.2 to 10.

14. The process of claim 12 wherein the rubbery ethylene copolymer of the first component is selected from the group consisting of ethylene-vinyl acetate copolymer containing from 8 to 60 percent vinyl acetate, ethylene-alkyl acrylate copolymer containing from 5 to 50 percent alkyl acrylate and ethylene-α-olefin copolymer containing from about 7 to 80 percent $C_{3-8}$ α-olefin.

15. The process of claim 12 wherein the filler of the first component is selected from the group consisting of carbon black, aluminium trihydrate, magnesium hydroxide or mixtures thereof.

16. The process of claim 12 wherein the first component additionally contains an antioxidant selected from the group consisting tetrakis[methylene 3-(3',5'-di-tert-butyl-4-hydrocinnamate)]methane, thiodiethylene bis-(3,5-ditertbutyl-4-hydroxyhydrocinnamate), n-octadecyl-β-(3,5-ditertbutyl-4-hydroxyphenyl)propionate, distearylthiodipropionate, dilaurylthiodipropionate, and polymerized 1,2-dihydro-2,2,4-trimethylquinoline.

17. The process of claim 12 wherein the silanol condensation catalyst of the second component is a compound selected from the group consisting of organic bases, carboxylic acids, organic titanates, and complexes or carboxylates of lead, cobalt, iron, nickel, zinc and tin.

18. The process of claim 12 wherein the olefin polymer of the second component is a homopolymer or copolymer of ethylene or propylene.

19. The process of claim 18 wherein the olefin polymer is polyethylene.

20. The process of claim 18 wherein the olefin polymer is a rubbery ethylene copolymer.

21. The process of claim 20 wherein the olefin polymer is ethylene-vinyl acetate copolymer or ethylene-n-butyl acrylate copolymer.

22. The process of claim 12 wherein the second component comprises 1 to 30 weight percent of the mixture.

23. The process of claim 22 wherein the silanol condensation catalyst is a dialkyl tin carboxylate and constitutes from 0.5 to 5 weight percent of said second component.

24. The process of claim 22 wherein the second component additionally contains an antioxidant selected from the group consisting of tetrakis[methylene 3-(3',5'-di-tertbutyl-4-hydrocinnamate)]methane, thiodiethylene bis(3,5-ditertbutyl-4-hydroxyhydrocinnamate), n-octadecyl-β-(3,5-ditertbutyl-4-hydroxyphenyl)propionate, distearylthiodi-propionate, dilaurylthiodipropionate, and polymerized 1,2-dihydro-2,2,4-trimethylquinoline.

25. The process of claim 22 wherein the homogeneous blend produced in step (2) is extruded onto an electric conductor.

26. The process of claim 25 wherein the extruded article is contacted with moisture at 95° C.

27. The process of claim 22 wherein for the preparation of the first component the filler and rubbery ethylene copolymer are premixed prior to incorporation of the ethylene-vinyltriethoxy-silane copolymer.

28. An insulated wire or cable product obtained by the process of claim 25.

* * * * *